March 10, 1931.  H. S. COVER  1,795,424
OPTICAL INSTRUMENT
Filed July 12, 1928  2 Sheets-Sheet 1

Witnesses:
K. W. Fischer
F. C. Appleton

Inventor.
Harvey, S. Cover.
By His Attorney.

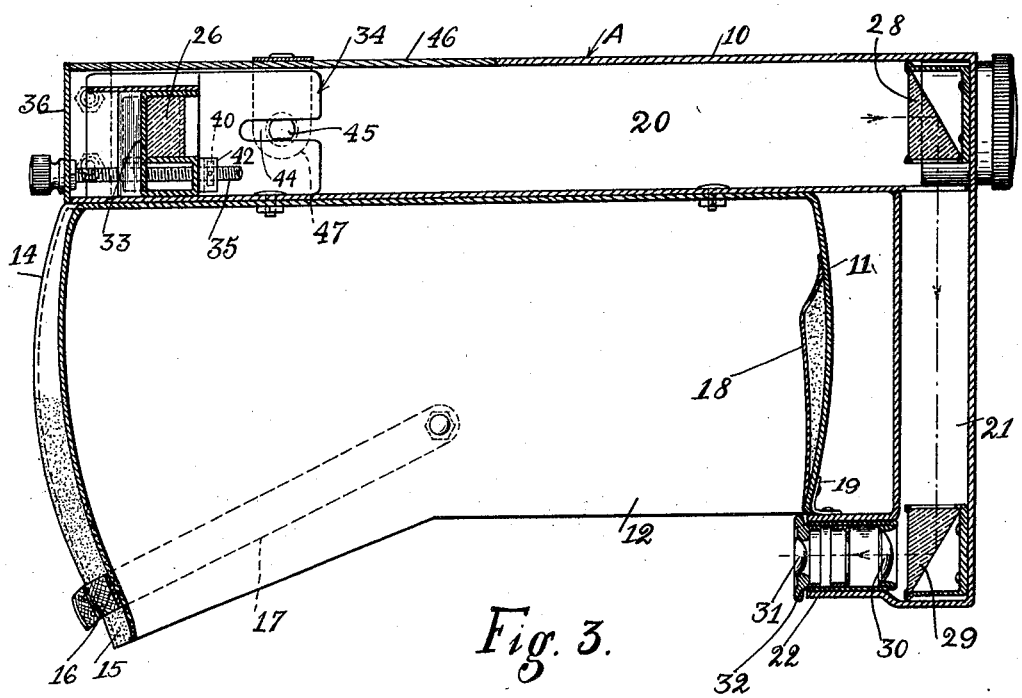
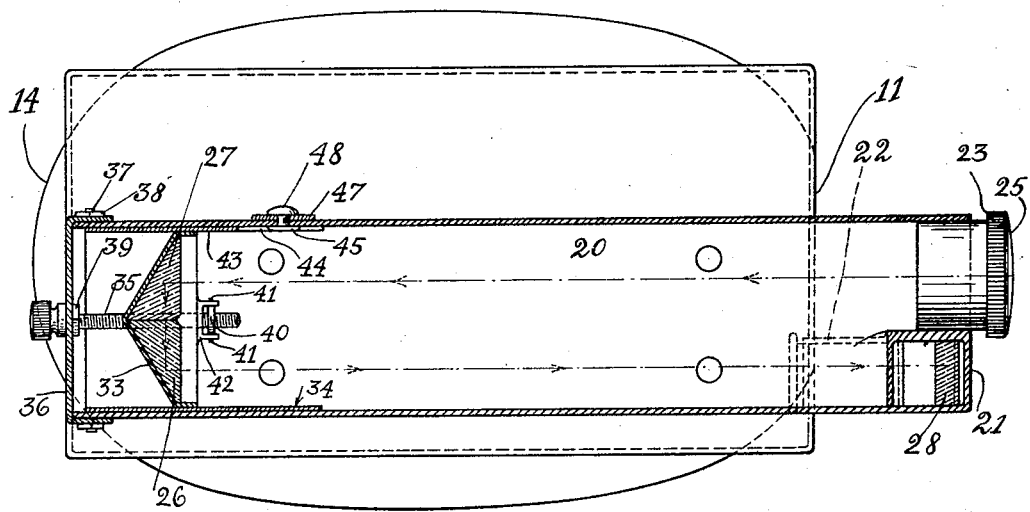

Patented Mar. 10, 1931

1,795,424

UNITED STATES PATENT OFFICE

HARVEY S. COVER, OF SOUTH BEND, INDIANA

OPTICAL INSTRUMENT

Application filed July 12, 1928. Serial No. 292,245.

My invention in general relates to optical instruments, and more particularly to an optical instrument designed and intended for observation of remote objects.

The main object of the invention is to provide an improved optical instrument of high magnifying power in the smallest possible compass, and in a form affording the maximum of convenience, portability and efficiency.

Another object of my invention is to provide a novel combination of helmet and telescope serving at once as a covering for the head and as a convenient casing for a powerful optical system of unusual focal length.

A further object is to provide a telescope of novel design and adaptability, with means to accommodate the device as a covering for different sizes of heads, and to adjust the optical system therein to suit the eyesight of different users.

Additional objects and advantages of the method and construction employed will appear more fully in the hereinafter specification when taken in connection with the accompanying drawings in which:

Fig. 3 is a longitudinal sectional view taken on line 3—3 of Fig. 2.

Fig. 4 is a longitudinal section taken on line 4—4 of Fig. 1.

Figure 1:
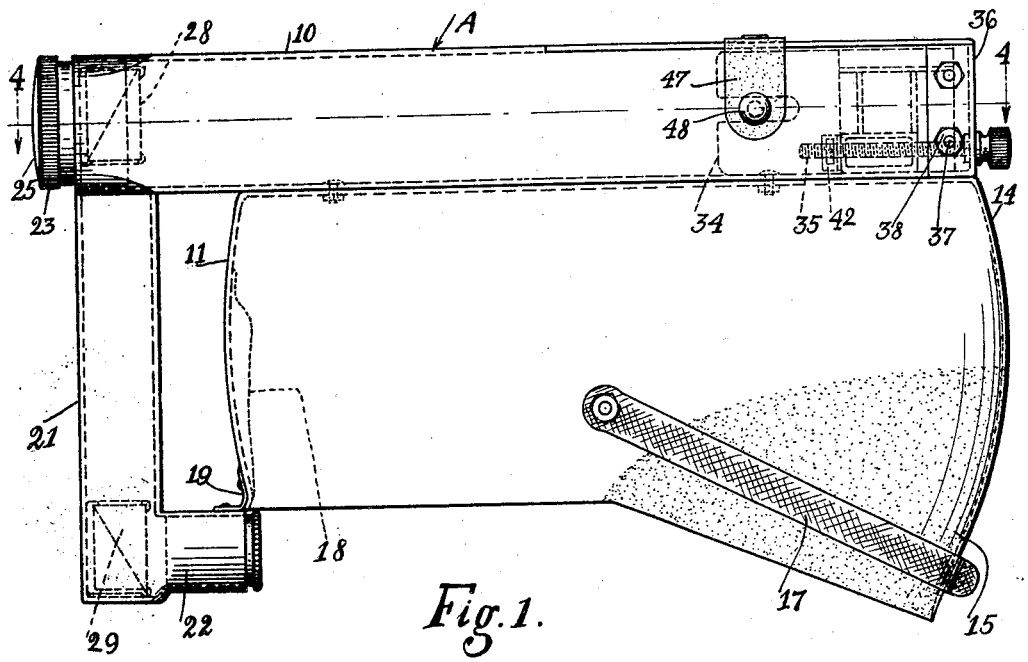
Fig. 1 is a side elevation of an embodiment of my invention.
Figure 2:
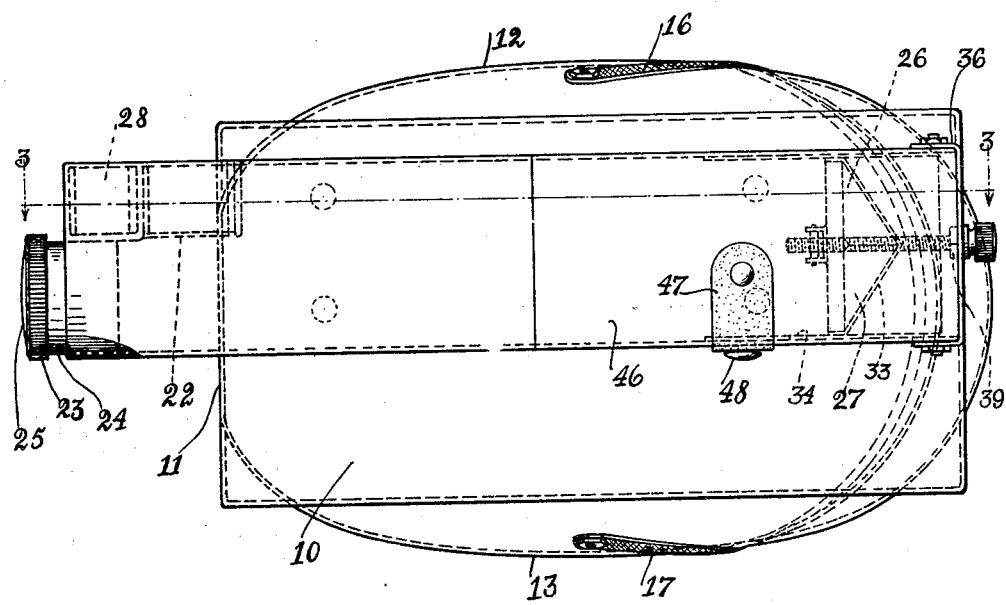
Fig. 2 is a top plan view thereof.

In the drawings of the preferred form of my invention, A designates a head box or helmet of fabricated or any suitable material, the head box comprising a top wall 10, front wall 11, side walls 12 and 13, and a rear wall 14, the rear wall having an inwardly curving flexible extension 15. A pair of elastic bands 16, 17 acting in conjunction with the flexible extension 15 and a projecting wedge shaped shelf 18 attached to the inside of the front wall of the head box, serve as a means to retain the latter on the head of the wearer, thereby preventing the device, and consequently the telescope therein from tilting.

Horizontally secured to the top wall or roof 10 is a casing 20 having a downwardly projecting tubular periscopic extension 21 at right angles thereto, and a second inwardly projecting tubular extension 22, which latter is fastened to the front wall 11 by a small angle bracket 19, the casing 20 and the extensions 21, 22 forming the container for a periscopic, prismatic, telescope, now to be described.

Secured in a cap 23, threaded in a collar 24 slidable in the front end of the casing, is a plano-convex lens 25 through which rays of light from an object are directed through a pair of reflecting prisms 26, 27, in the direction as shown by the dotted arrows,—the rays of light being reversed and caused to travel back to a single prism 28, whence they are reflected downwardly at right angles to another prism 29, and then reflected through the lens 30, 31 of the ocular 32, which in the the present illustration is of the conventional Huygens type.

The prisms 26, 27 are secured in a V-shaped frame 33, fastened or forming a part of a sleeve-frame 34, slidably confined in the interior of the casing 20, and adjustable longitudinally by means of a screw-threaded rod 35 rotatably mounted in a metal strip 36, forming the back wall of and secured to the casing 20 by bolts and nuts 37, 38. The rod 35 which is confined in the wall of the metal strip against longitudinal movement by a fixed nut 39 made fast to the shaft of the rod,—coacts with a threaded nut 40 having wings 41 retained in a bracket 42 which latter is secured to the lower front wall of the sleeve-frame. When the threaded rod 35 is turned, the shaft thereof will advance or retard the nut 40 according to the direction of rotation of the rod, in consequence of which the sleeve-frame and the prisms therein will move to and fro, thereby changing the focal length of the optical system and permitting the varying of the magnifying power of this device to meet the requirements of different individuals. One of the side walls 34 of the sleeve-frame is provided with a slot 44, wherein rides a headed pin 45, the pin and slot providing a means for maintaining the sleeve-frame in alignment within the inner walls of the casing 20. When it is desired to inspect the interior of the casing, the lid 46, which is suitably hinged to one of the side walls of the casing and provided with a flexible strip 47 having a snap fastener 48 may be swung back to permit access to the interior of the casing for the adjustment and cleansing of the prisms and lens, when desired.

The function and mode of operation of my device has been in part indicated by the foregoing description, but will now be made more fully apparent by the following explanation: In using the device, the eye is applied to the ocular 32 and the head box then drawn down over the head in the manner of a cap, the flexible back wall and the elastic bands serving to maintain the device securely upon the head of the wearer. The screw threaded adjusting rod 35 will now be turned to slide the frame 28 and the prisms therein, in this manner varying the focal range of the optical system to suit the eye of the observer. It will here be noted that since rays of light through the object glass falling upon the pair of prisms 26, 27, are reversed into position by passing therethrough, any movement forward or backward in these prisms will result in a twofold movement of the light beams by reason of the increased or decreased length of travel both in a forward and backward direction of the incident light rays.

The downwardly projecting periscopic tube 21 permits the user to survey objects from a plane at a substantially higher level than that of his eye. The advantage of this periscopic vision for use where it is desirable that an observer maintain his position hidden is self evident in military use, hunting, etc. While one eye of the user of the device may be applied for surveying objects through the telescope, the other eye is left free for normal use. It is also to be noted that when desired, both eyes may be used for natural vision by merely tilting the head box upwardly.

Among the advantages to be obtained in the optical system employed in the present device may be mentioned the fact that by reason of the comparatively long path of the rays from the object glass to the ocular, the focal length of the object glass is prolonged over a path several times as great as in the well known prism binoculars, in consequence of which the magnifying power, a function of the focal length, is correspondingly increased.

It will be observed that the system of lens and prism employed in the present device presents an upright image, being in this respect like the terrestrial telescope. Converging rays of light from the object glass after passing through the two prisms 26, 27 are reversed in position and direction and thence passed through the single prism 28, and then through prism 29, the last two prisms again effecting a complete reversal of direction of the light rays and an interchange of the two sides of the projected image. The inverted image at this point is now made erect by the negative Huygens ocular 32. If desired, by the substitution of oculars of various powers, the magnifying capacity of the instrument may be increased or decreased to any desired degree within the limits found practical in optical instruments; or the instrument may be converted into the astronomical type of telescope in which the image is inverted, by the substitution of a positive eye piece of the Ramsden type. However, since the terrestrial species of telescope offers an additional convenience in that it may be used for marine or land surveying purposes, in addition to astronomical use, the terrestrial type is deemed preferable.

The device illustrated and described offers many conveniences in that it is quite comfortable for an observer to wear a helmet of the kind described with the high magnifying power optical system installed for as many hours as he is ordinarily accustomed to wearing a hat, the head in addition being less subject to trembling or movements which in the case of hand supported instruments renders observation of remote objects at high magnification exceedingly difficult. The periscopic feature, as pointed out above, enables an observer to make reconnaissances and observation without direct exposure of his person.

While I have in the present description and disclosure set forth with particularity a preferred form of construction, it will be understood the device is susceptible of wide modification and change. For example the head box or helmet which, as illustrated, is of a square configuration with the optical system secured to the top thereof, may be made to resemble a conventional helmet or stiff hat, the object glass in the front then being the only feature distinguishing my device from an ordinary article of head gear. I do not wish, therefore, to have the device confined to the exact details as set forth, but desire to avail myself of such variations and modifications as fairly fall within the scope of the appended claims.

What I claim as new and desire to secure by Letters Patent is:

1. An optical instrument comprised in the form of a helmet, said helmet having a plurality of lenses and prism containing tubes, joined at right angles in a manner to provide a prolonged path for light entering at one end to be subjected to several reversals of direction by said prisms and thence reflected into an eye of the wearer of said helmet through a removable ocular.

2. An optical instrument comprising in combination a telescope and a helmet, said helmet having elastic an flexible means to enable the helmet to be adjusted to heads of different sizes, part of the lens receiving system in said helmet being placed at a plane substantially higher than the level of the eyes, a plurality of total light-reflecting prisms in said helmet cooperating with said lens in a manner to focus and reflect light from a higher plane to a lower plane into an eye of the wearer.

3. A telescope comprising a head box to be worn on the head, provided with a plurality of tubes arranged to convey light through a plurality of optical means in a periscopic tube arrangement in the head box to an eye of the wearer of said head box from an upper plane to a plane on the level of the said wearer's eyes.

4. A telescope comprising a head box to be worn on the head, a plurality of tubes mounted on the head box and provided with optical means for conveying light periscopically to an eye of the wearer of the head box, adjustable light reflecting prisms in the head box for varying the focal range and consequently the magnifying power of the telescope, means including a flexible element, a plurality of elastic instrumentalities, and a wedge shaped piece, said flexible element, instrumentalities, and wedge shaped piece coacting to maintain the head box securely on the head of the wearer in a manner to prevent tilting.

5. A telescope mounted upon a helmet adapted to be worn upon the head of the user and comprising an object lens; an ocular member adapted to register with an eye of the user when the helmet is in position, said ocular member being horizontally offset from said object lens; and reflector means interposed between said object lens and said ocular member.

6. A telescope mounted upon a helmet adapted to be worn upon the head of the user and comprising an object lens; an ocular member adapted to register with an eye of the user when the helmet is in position, said ocular member being horizontally offset from said object lens; reflector means interposed between said object lens and said ocular member; and means for adjusting the focal range.

7. A telescope mounted upon a helmet adapted to be worn upon the head of the user and comprising an object lens; an ocular member adapted to register with an eye of the user when the helmet is in position, said ocular member being horizontally offset from said object lens; reflector means interposed between said object lens and said ocular member; and means for altering the position of said reflector means for adjusting the focal range.

8. A prismatic telescopic instrument of the character described comprising, in combination, a supporting helmet adapted to be worn upon the head of the observer, a longitudinally extending casing mounted upon said helmet, an object lens mounted adjacent the forward extremity of said casing, a total reflecting prism slidably mounted adjacent the rearward portion of said casing and in a vertical plane to the rear of the eyes of the observer, an ocular lens, reflecting means for transmitting light from said total reflecting prism through said ocular lens, and means for changing the relative position of said total reflecting prism for focusing purposes.

9. A prismatic telescopic instrument of the character described comprising, in combination, a supporting helmet adapted to be worn upon the head of the observer, a longitudinally extending casing mounted upon said helmet, an object lens mounted adjacent the forward extremity of said casing, a total reflecting prism slidably mounted adjacent the rearward portion of said casing and in a vertical plane to the rear of the eyes of the observer, an ocular lens, reflecting means for transmitting light from said total reflecting prism through said ocular lens, and a manually operated member rotatably mounted and adapted to advance or retard said total reflecting prism for changing the relative position thereof for focusing purposes.

10. A prismatic telescopic instrument of the character described comprising, in combination, a supporting helmet adapted to be worn upon the head of the observer, a longitudinally extending casing mounted upon said helmet, an object lens mounted adjacent the forward extremity of said casing, a total reflecting prism slidably mounted adjacent the rearward portion of said casing and in a vertical plane to the rear of the eyes of the observer, a tubular member mounted adjacent the forward portion of said helmet, an ocular lens mounted adjacent one end of said tubular member, reflecting means in said tubular member, and means for changing the relative position of said total reflecting prism for focusing purposes.

11. A prismatic telescopic instrument of the character described comprising, in combination, a supporting helmet adapted to be worn upon the head of the observer, a longitudinally extending casing mounted upon said helmet, an object lens mounted adjacent the forward extremity of said casing, a total reflecting prism slidably mounted adjacent the rearward portion of said casing and in a vertical plane to the rear of the eyes of the observer, a tubular member mounted adjacent the forward portion of said helmet, an ocular lens mounted adjacent one end of said tubular member, reflecting means in said tubular member, and a manually operated member rotatably mounted and adapted to advance or retard said total reflecting prism for changing the relative position thereof for focusing purposes.

In testimony whereof I have signed my name to this specification.

HARVEY S. COVER.